United States Patent
Livingston et al.

(12) 
(10) Patent No.: US 6,555,838 B1
(45) Date of Patent: Apr. 29, 2003

(54) METHOD AND APPARATUS FOR RADIOGRAPHIC IMAGING

(75) Inventors: Troy W. Livingston, Northbrook, IL (US); Michael Monahan, Beach Park, IL (US)

(73) Assignee: Essex Electro Engineering, Inc., Schaumburg, IL (US)

( * ) Notice: Subject to any disclaimer, the term of this patent is extended or adjusted under 35 U.S.C. 154(b) by 0 days.

(21) Appl. No.: 09/721,014

(22) Filed: Nov. 22, 2000

Related U.S. Application Data

(60) Provisional application No. 60/214,930, filed on Jun. 29, 2000.

(51) Int. Cl.$^7$ .......................... G03B 42/08; G03B 42/02
(52) U.S. Cl. ..................... 250/585; 250/584; 250/586
(58) Field of Search .................. 250/585, 581, 250/582, 583, 584, 586

(56) References Cited

U.S. PATENT DOCUMENTS

| | | | | |
|---|---|---|---|---|
| 4,737,641 A | * | 4/1988 | Lange et al. | 250/585 |
| 4,876,452 A | * | 10/1989 | Horikawa | 250/458.1 |
| 4,894,548 A | * | 1/1990 | Takahashi et al. | 250/484.4 |
| 4,950,895 A | * | 8/1990 | Reinfelder | 250/484.4 |
| 5,003,182 A | * | 3/1991 | Umemoto et al. | 250/585 |
| 5,266,803 A | * | 11/1993 | Heffelfinger | 250/484.4 |
| 5,898,184 A | * | 4/1999 | Stahl et al. | 250/584 |
| 5,900,640 A | * | 5/1999 | Ogura | 250/583 |
| 5,952,666 A | * | 9/1999 | Nakano et al. | 250/484.4 |
| 6,130,440 A | * | 10/2000 | Ogura | 250/583 |

FOREIGN PATENT DOCUMENTS

| JP | 60-093425 | * | 5/1985 | G03B/42/02 |
|---|---|---|---|---|

* cited by examiner

*Primary Examiner*—Constantine Hannaher
*Assistant Examiner*—Albert Gagliardi
(74) *Attorney, Agent, or Firm*—Fitch, Even, Tabin & Flannery

(57) ABSTRACT

An apparatus and method for radiographic image includes a plurality of light emitting diodes two of which produce light in the optical or visible wavelengths, another one of which produces light in an infrared wavelength so that pumping light can be supplied to a variety of radiographic substrate media. The pumping light is supplied to the medium by a plurality of optical fibers arranged in a linear array as the medium is scanned beneath the fibers. A second plurality of linear optical fibers picks up phosphorescent emissions from the radiographic medium due to the pumping light excitation and supplies the emissions to a photodiode or other optical receiver where the light intensity is translated into an electrical signal. The signal is sent to a processor which generates an image signal. The image signal may then be converted into an image representative of the latent x-ray image on the radiographic medium.

3 Claims, 4 Drawing Sheets

METHOD AND APPARATUS FOR RADIOGRAPHIC IMAGING

CROSS REFERENCE TO RELATED APPLICATION

Priority is claimed from U.S. provisional application No. 60/214,930, filed Jun. 29, 2000.

BACKGROUND OF THE INVENTION

The invention generally relates to radiographic imaging and, more particularly, relates to a method and apparatus for reading a computed radiography phosphor medium that has been exposed by x-rays by supplying pumping light thereto.

It is well known that by using x-ray systems, items can be visualized within the human body or within industrial products, or the like. Current x-ray systems often use x-ray film, which must be developed or use computed tomography installations which are very expensive and require large amounts of computer power.

In addition, systems exist which use a technique called computer radiography, in which a sample or a patient is exposed with x-rays and a latent x-ray image is formed on a phosphor-containing sheet similar to a sheet of film. The phosphor-containing sheet may typically include a rare earth, such as europium, in combination with barium and fluorine. Other sheet formulations also are available. The sheet, which must be kept in the dark, is then imaged by exposing the sheet to a raster-scanned laser beam causing areas which have preferentially received x-ray energy to phosphoresce yielding an image.

While the system is convenient and allows the reuse of the sheets multiple numbers of time, it does suffer from certain drawbacks. It is difficult to obtain high-spatial resolution because the pumping laser beam, although only covering a small spot-size at a time, tends to leave illumination energy behind, which causes bloom; thereby smearing the image and reducing its resolution. This is because the image is built up in the way that an image might be with a flying spot device wherein only a single optical detector is used. The single optical detector can capture radiation from almost any direction. Thus, the single detector is unable to determine whether the photons it is receiving are coming from unwanted bloom or coming from active phosphorescence.

In addition, the existing systems which typically use a laser, either operate the laser at about 630 to 650 nanometers or, in the near infrared range, at about 930 nanometers. A single laser cannot be used for both wavelengths. Because there are differing types of latent imaging materials used for computer tomography, not all phosphoresce either with red pumping or with infrared pumping. Thus, a scanner which uses a pumping laser in the red or infrared region, cannot accept latent images formed for pumping in the opposite region.

Furthermore, the raster-scanned laser system introduces spatial nonlinearities in the image which must be compensated for. The non-linearities are due to the difference in the effective scan rate when the beam is substantially perpendicular to the latent image film at the center portion of the film and when it is sweeping at a relatively large angle with respect to the medium near its edges. As a result, since the only way to costruct the image coming back is based on pumping beam timing and orientation, elaborate methods must be taken in order to relinearize the beam scan in order to construct an undistorted image.

What is needed then, is a system and apparatus which can quickly and conveniently provide highly-accurate computed radiography images without the need for expensive equipment.

SUMMARY OF THE INVENTION

The present invention is embodied in an apparatus and method for radiographic imaging wherein a substrate is exposed to x-radiation to form a latent image thereon. The apparatus comprises a plurality of light emitting diodes emitting incoherent light at two different visible wavelengths and one infrared wavelength. The LEDs supply light to a plurality of optical pumping fibers which deliver the incoherent light to the radiographic medium. The optical pumping fibers have their delivery ends aligned in a linear array and a motor causes the plate or radiographic medium to be moved under the linear fiber array as it is exposed to the pumping light from the fibers. In addition the fibers are multiplexed in groups of 64 so that there is no unwanted bloom from one excitation or pumping fiber to the next at any one time. This improves the optical resolution provided by the pumping light.

A second plurality of optical fibers each having a diameter of about 500 microns collect the emitted light and deliver the emitted light to photodiodes or other optical transducers which change the light intensity to an electrical signal. That signal is supplied to a processor which generates an image signal. The image signal may then be used to generate an image representative of the latent x-ray image on the radiographic substrate.

It is a principal object of the present invention to provide a high resolution radiographic imaging apparatus.

It is another object of the present invention to provide a high resolution radiographic image using incoherent low cost optical sources such as light emitting diodes as pump sources.

Other aspects and advantages of the present invention will become obvious to one of ordinary skill in the art upon a perusal of the following specification and claims in light of the accompanying drawings.

DETAILED DESCRIPTION OF THE PREFERRED EMBODIMENTS

Figure 1:
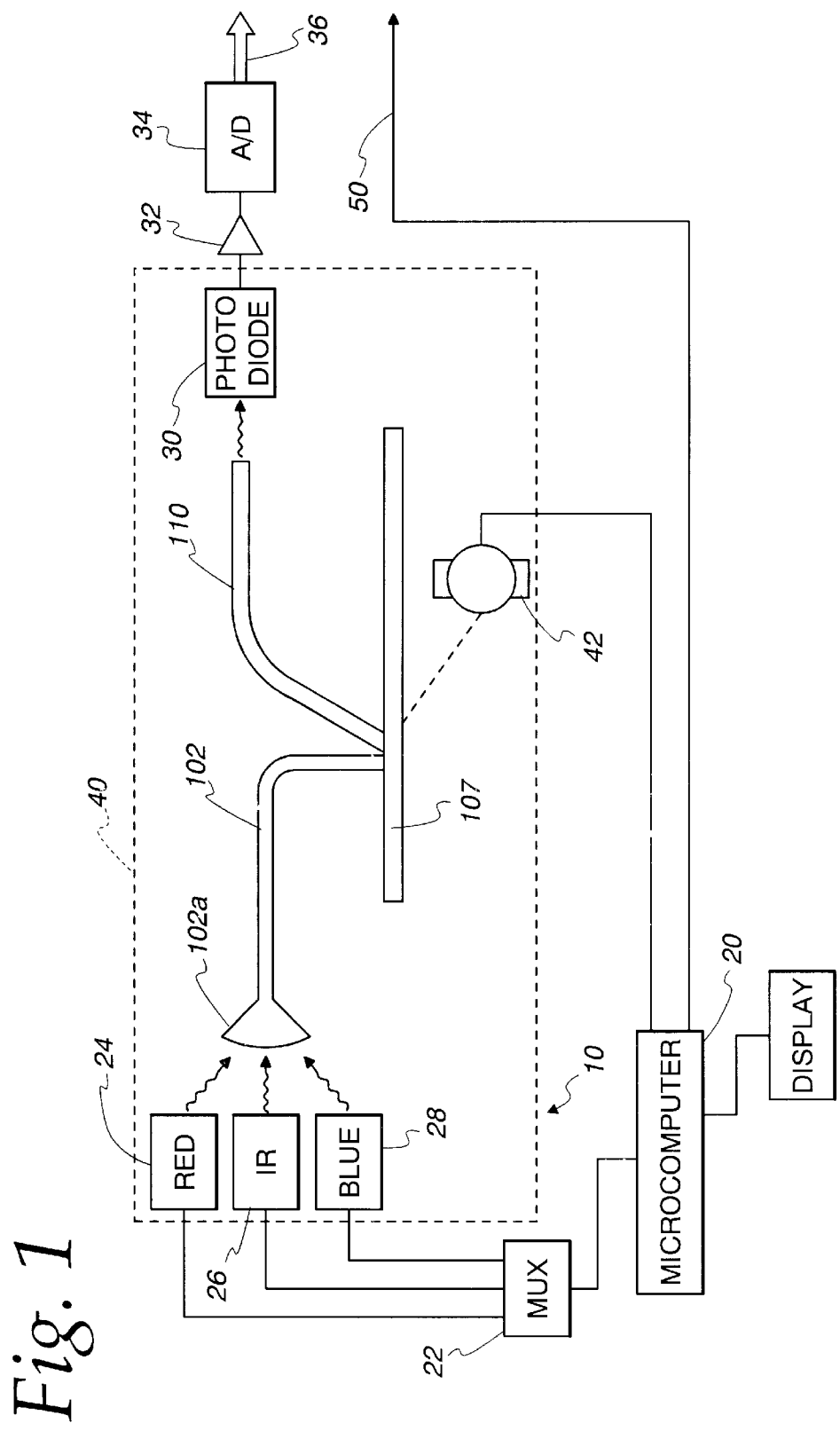
FIG. 1 is a block diagram of a system embodying the method and apparatus of the present invention.
Figure 6:
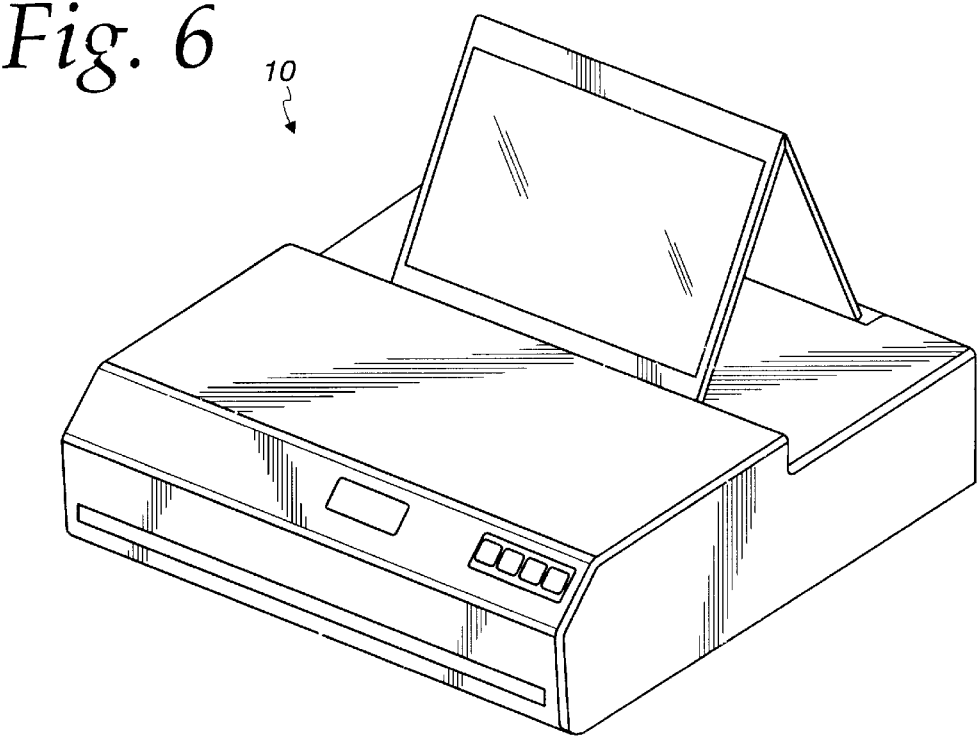
FIG. 6 is a perspective view of the apparatus shown in FIG. 1.

Referring now to the drawings, and especially to FIGS. 1 and 6, an apparatus 10 embodying the present invention is generally shown therein and includes a microcomputer 20 for controlling a multiplexer 22 to energize a red pumping light emitting diode 24, an infrared light emitting diode 26 or a blue pumping light-emitting diode 28, either one at a time or simultaneously. This is done in order to transmit light to a lensing body 102a of a 25–50 millimeter optical fiber 102 for delivery of light to the computed radiography substrate 107. Received light created by phosphorescence at a pixel on the plate 107 which was exposed to x-rays is transmitted along the receive fiber 110 to a photodiode 30. The photodiode 30 converts the phosphorescent light to an electrical signal. An operational amplifier 32 amplifies the signal and feeds an amplified analog received phosphorescent light signal to an analog-to-digital converter which provides a digital output signal indicative of the spot density or spot intensity on a bus 36. In addition, the computed radiography plate 107, which is held within a light-tight enclosure 40, is moved by a stepper motor 42, driven by the microcomputer 20 past the array 101 comprising the optical fibers 102 and 110 to cause the plate 107 to be scanned. The microcomputer 20 then provides output signals on an output position bus 50 indicative of the position at which the scan being read took place both transversely with respect to the optical array 101, and longitudinally with respect to the travel of the plate.

Figure 2:
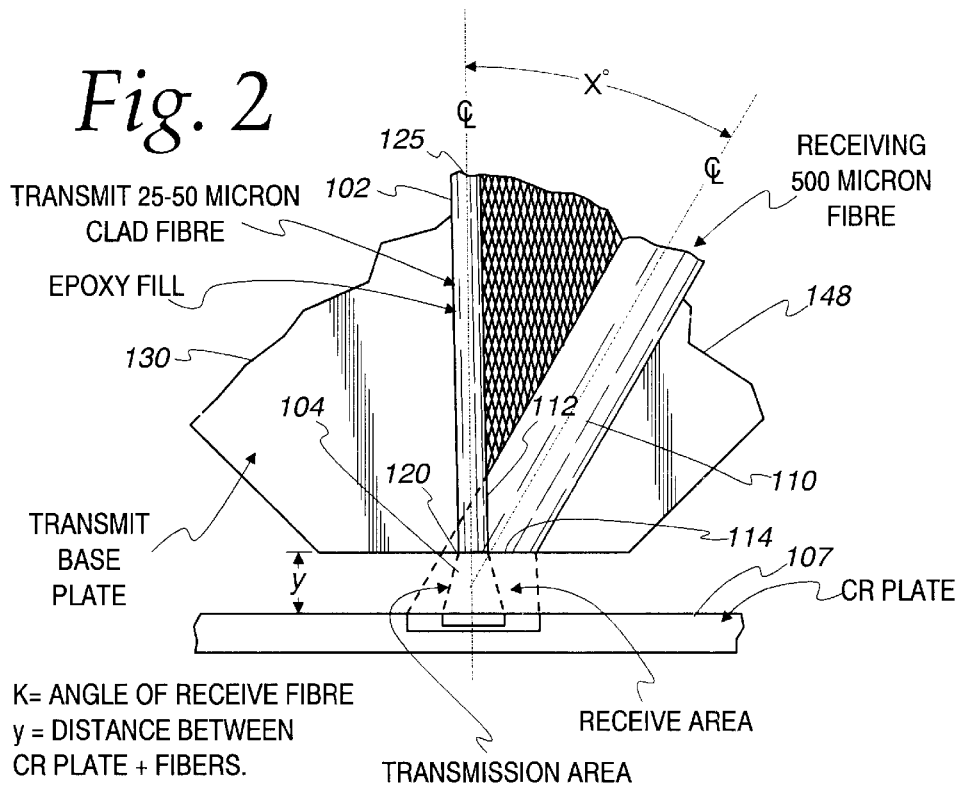
FIG. 2 is a detail view of the orientation of a transmitting fiber and a receiving fiber of the apparatus shown in FIG. 1.
Figure 3:
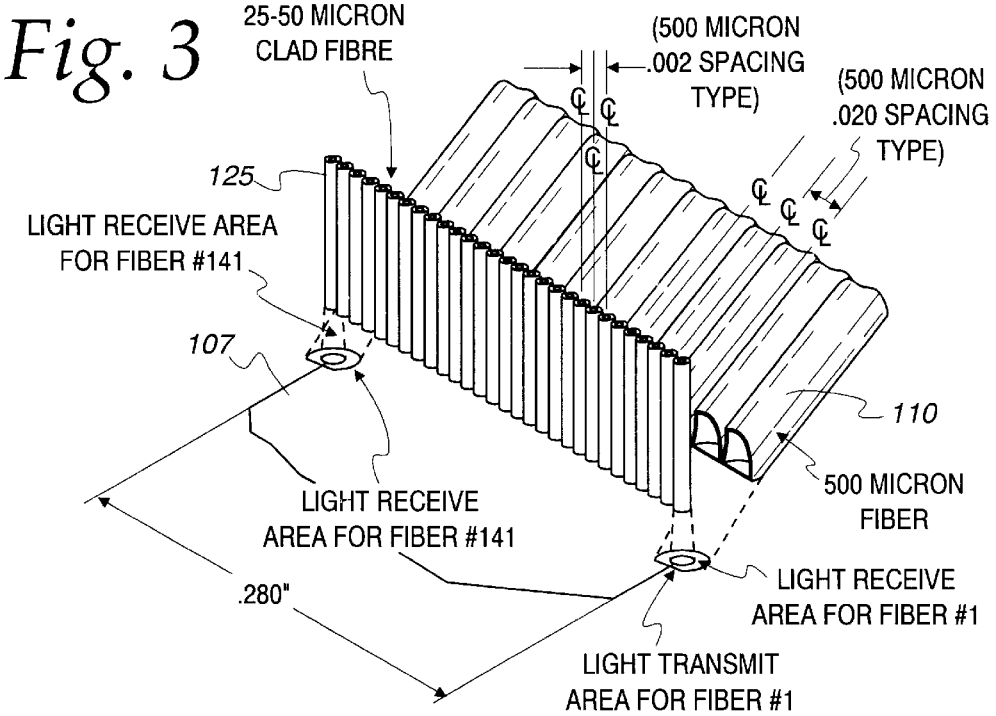
FIG. 3 is a perspective view of multiple transmitting and receiving fibers above a surface which is being excited of the apparatus shown in FIG. 1.
Figure 4:
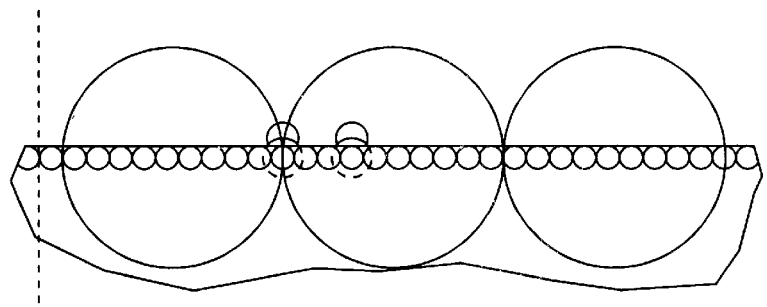
FIG. 4 is a diagrammatic view of the layout of the transmitting fibers with respect to the larger receive fibers of the apparatus shown in FIG. 1.
Figure 5:
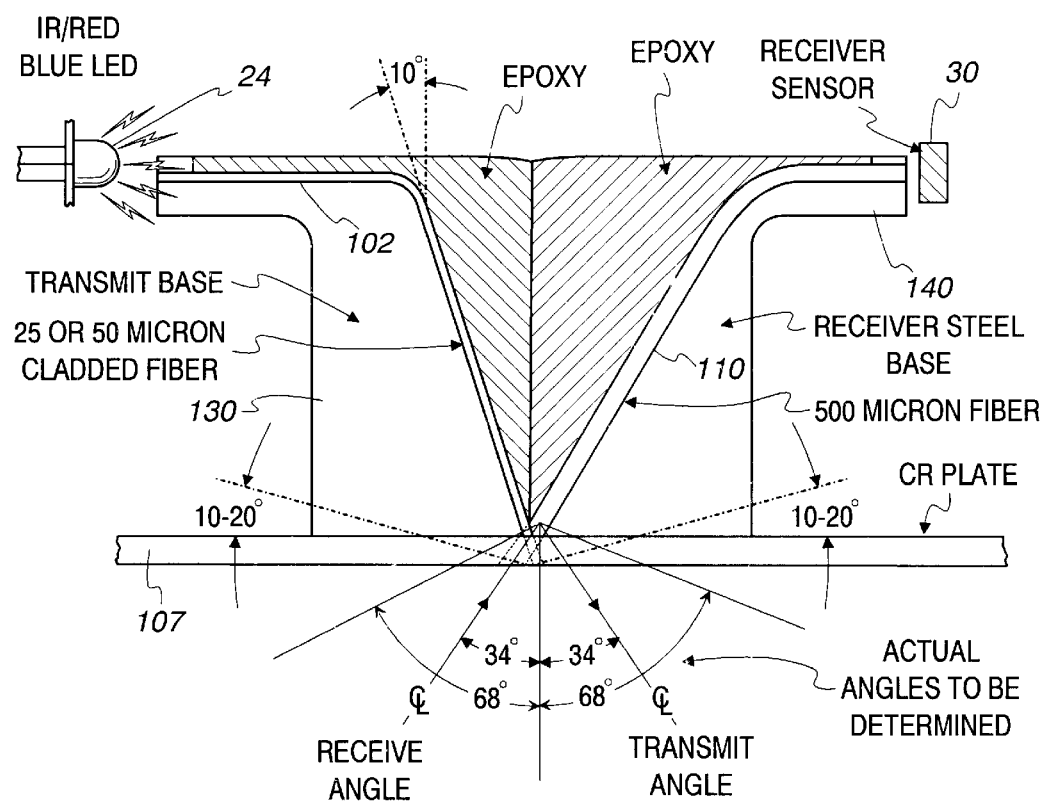
FIG. 5 is a sectional view of the apparatus shown in FIG. 1 shown partially in schematic and showing the illumination of a transmitting fiber, light passing back through a receiving fiber to a receive sensor, and the epoxy trapping the fibers, as well as the support arms which support the multiple fibers in registration.

The method and the apparatus of the present invention employs multiple light emitting diodes one of which can emit at 940 nanometers in the near-infrared region. The second diode, which emits between 630 and 650 nanometers in the red region and a diode which emits in the blue region. The diodes are each coupled to a separate 5 micron diameter-clad optical fiber used as a transmission fiber which delivers the infrared, the red, or the blue light to the computed radiography plate, as may best be seen in FIG. 2. In that figure, a 25 to 50 micron-clad fiber 102 extends substantially perpendicular to the plate and emits a fan-like beam 104 of infrared or red light which strikes the plate 107 at a spot 106. The area immediately around that spot is excited and emits light which is collected by a 500 micron diameter clad optical fiber 110 which extends away from the plate 107. It may be appreciated that the receive fiber 110 has a vertical matching face 112 and a light receiving face 114 to allow a lensing region 120 of the transmit fiber 102 to be very close to the collection face 114 of the receive fiber to provide extremely high resolution. The transmit fiber 102 is one of approximately 8,000 transmit fibers, as may best be seen in FIG. 3, which transmit fibers 102 may each be separately excited by a light-emitting diode. In the alternative, should higher power be desired, lasers could be used for the excitation; however, this is unnecessary as adequate amounts of light are provided for phosphorescence at the plate 107 by the light emitting diodes through use of the optical fibers. The plurality of transmit fibers 125 is supported by an aluminum transmit base plate or support bar 130, in order to maintain the fibers 125 in registration and in linearity so that they will be positioned a relatively short distance above the plate. The plate 107 is moved by the stepper motor underneath the fiber array allowing rapid scanning of the plate 107. In addition, the receive fibers 110 are supported by a receive fiber plate or support arm 140, which is composed of aluminum.

Another advantage of the present invention is that through the use of LEDs to provide pumping light, the pass bands are broad enough that they need not be specifically tuned to a specific frequency. The broad band outputs transfer energy to which the various computed radiography plates are sensitive. In addition, the optical fiber arrays can be calibrated by providing blue light through the transmitting fibers and then collecting the light through the receive fibers to determine the exact registration of the blue light which is being provided to the base.

In effect, three LEDs are provided through a lensing system to feed the fibers. This provides a great deal of convenience because, due to the multiple frequencies of the LEDs, different types of plates can be used in a single scanner, which was not available in the prior art. Furthermore, emission can take place in both the infrared and the visible red band simultaneously so that any type of plate can be read. Through the use of the fiber optics, the light can be focused precisely on the plate to reduce the pixel size to about 50 microns. Thus, incoherent, inexpensive light sources can be used rather than coherent light sources, as were used in the prior art laser-based systems.

Furthermore, the transmitting fibers are energized in multiple units; however, only every $63^{rd}$ or $64^{th}$ fiber in the array is energized to provide a wide distance between simultaneously energized fibers to avoid crosstalk between energized spots on the CR plate. However, the multiple energization, through the transmit optical fibers, provides very rapid response back through the receive fibers while avoiding crosstalk and smearing of the image at the plate. The received light, coming into the 500 micron fibers, is then received by separate photodetectors 150, the light, is then amplified in an operational amplifier circuit and the operational amplifier provides a low-noise signal to an analog to digital converter which, in the present embodiment, has sixteen bits of resolution and provides a sixteen-bit intensity signal for further processing for displaying an image or the like.

In order to provide the highly-accurate spot sizes, the 500 micron fiber ends are polished flat in order to allow them to be seated against the transmit fibers without distorting the transmit fiber line into a catenary or sine wave line, which would lead to distortion in the excitation areas on the computed radiography plate. Further, the transmit fibers are held in alignment by the transmit support bar to which they are attached even though they are brought into intimate contact or very close proximity with the receive fibers. Likewise, the receive fibers are rigidly held by the receive fiber support bar and then both the receive fibers and the transmit fibers are covered with a potting compound or suitable opaque compound, which prevents light from entering the fibers through their sides, thereby reducing crosstalk and holds them rigidly over a wide range of temperatures. The fiber ends may be supported by an air bearing at about 0.0015 to 0.0020 inches above the medium being scanned. This will provide high resolution scanning be controlling the spot overlap at the medium.

Furthermore, through the use of the multiple LEDs and the multiple transmitters, the new LEDs can be used to monitor using non-phosphorescent or normalizing light to determine if an LED has gone out, which can't be done with a laser system. This would be indicated by the normalization data going out of range rapidly. Furthermore, the use of the multi-transmit fiber elements enables the adjacent 50 micron pixel regions on the computed radiography plate to be energized and allows determination of blooming or smearing noise or residuals, which cannot be done with conventional laser-based systems.

Figure 7:
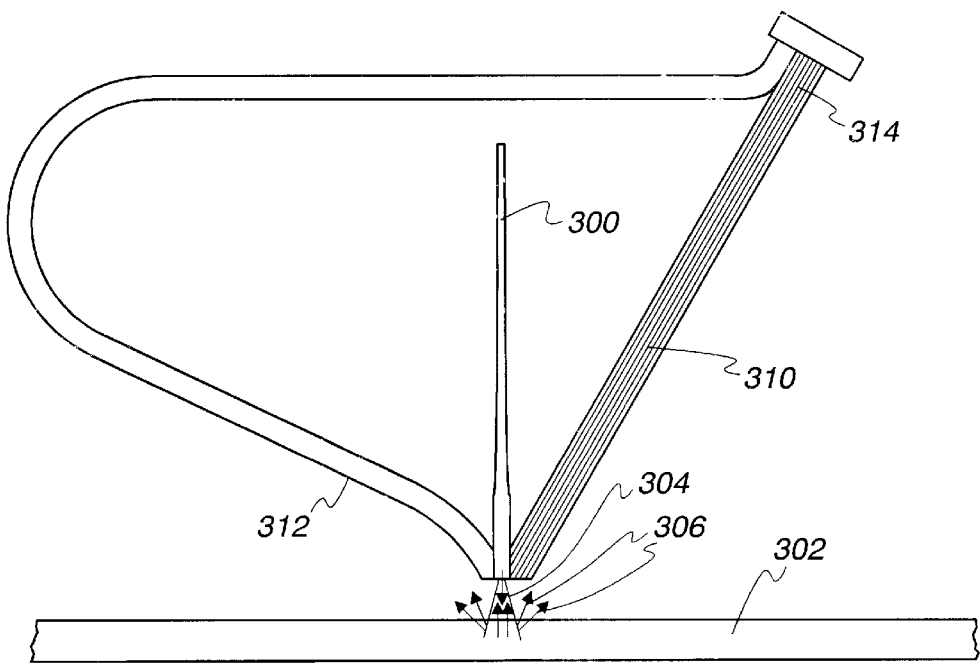
FIG. 7 is a sectional view of an alternative embodiment of the present invention.

As may best be seen FIG. 7 in an alternative embodiment a plurality of excitation or pumping fibers as exemplified by a fiber three hundred having a core diameter of about 27 microns supplies light to a substrate 302 in a light cone 304 phosphorus and emissions 306 may be received back by a first received fiber 310 or a second received fiber 312 on opposite sides of the excitation fiber 300 in order to capture more of the phosphorus and light from the medium 302 the fiber 312 and 310 may be combined at a fiber junction 314 to supply a larger optical output for ultimate detection by an optical detector.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. Apparatus for radiographic imaging without a rotating light source or a rotating mirror light source comprising:

a plurality of stationary, optical pump sources for generating pumping light;

a plurality of optical fibers having ends in a linear array for delivering the pumping light from the optical pump sources to a radiographic medium;

a multiplexer associated with the optical pump sources for delivering the pumped light to the fibers in multiplex groups to energize spots on the radiographic medium with the energized spots being non-adjacent and spaced apart by non-energized spot locations to avoid cross talk between energized spots on the radiographic medium;

an optical light transmitter for receiving emitted phosphorescent light from the radiographic medium and for transmitting the emitted light;

an optical receiver for receiving the emitted phosphorescent light delivered by the optical light transmitter and producing an optical signal in response thereto; and a processor for generating an image signal from the optical signals from the optical receiver.

2. Apparatus for radiographic imaging according to claim 1 wherein the optical pump sources comprise light emitting diodes providing incoherent light.

3. Apparatus for radiographic imaging according to claim 2 wherein one of the light emitting diodes comprises an infrared light emitting diode.

\* \* \* \* \*